(12) United States Patent
Lin et al.

(10) Patent No.: US 12,282,247 B2
(45) Date of Patent: Apr. 22, 2025

(54) DETECTION DEVICE PREVENTING DAMAGE TO DETECTION MODULE FROM HEAT GENERATED BY LIGHT SOURCE

(71) Applicants: HONGFUJIN PRECISION ELECTRONICS (ZHENGZHOU) CO., LTD., Zhengzhou (CN); Henan Fuchi Technology Co., Ltd., Zhengzhou (CN)

(72) Inventors: Hsin-Ta Lin, New Taipei (TW); Chia-Wei Hsu, New Taipei (TW)

(73) Assignees: HONGFUJIN PRECISION ELECTRONICS (ZHENGZHOU) CO., LTD., Zhengzhou (CN); Henan Fuchi Technology Co., Ltd., Zhengzhou (CN)

( * ) Notice: Subject to any disclaimer, the term of this patent is extended or adjusted under 35 U.S.C. 154(b) by 504 days.

(21) Appl. No.: 17/829,595

(22) Filed: Jun. 1, 2022

(65) Prior Publication Data

US 2022/0404687 A1 Dec. 22, 2022

(30) Foreign Application Priority Data

Jun. 22, 2021 (CN) .......................... 202110693570.3

(51) Int. Cl.
*G03B 17/55* (2021.01)
*G03B 15/03* (2021.01)

(52) U.S. Cl.
CPC ............. *G03B 17/55* (2013.01); *G03B 15/03* (2013.01)

(58) Field of Classification Search
CPC ......... G03B 17/55; G03B 15/03; G03B 21/16
See application file for complete search history.

(56) References Cited

U.S. PATENT DOCUMENTS

| | | | |
|---|---|---|---|
| 2014/0071500 A1* | 3/2014 | Kurotsu | H04N 1/00519 |
| | | | 358/474 |
| 2020/0099902 A1* | 3/2020 | Egawa | H04N 9/3158 |
| 2020/0341358 A1* | 10/2020 | Hou | H05K 7/20 |
| 2021/0084208 A1* | 3/2021 | Mleczko | H04N 23/51 |
| 2021/0223671 A1* | 7/2021 | Tsai | H04N 9/3144 |
| 2021/0389651 A1* | 12/2021 | Matsui | H05K 7/2039 |
| 2022/0100024 A1* | 3/2022 | Li | G03B 21/006 |
| 2022/0100065 A1* | 3/2022 | Chang | G03B 21/145 |
| 2023/0216994 A1* | 7/2023 | Hirasawa | G03B 21/14 |
| | | | 353/52 |

* cited by examiner

*Primary Examiner* — Clayton E. LaBalle
*Assistant Examiner* — Diana Hancock
(74) *Attorney, Agent, or Firm* — ScienBiziP, P.C.

(57) ABSTRACT

A detection device includes a substrate, a light source, a detection module, and a heat dissipation module. The substrate includes a first base plate, a second base plate, and at least one connecting portion connecting the first base plate to the second base plate. The light source is disposed on the first base plate. The detection module is disposed on the second base plate. The first base plate has a first surface towards the at least one connecting portion, and the at least one connecting portion has a second surface towards the first base plate. The second surface is connected to a portion of the first surface. The heat dissipation module is disposed on the at least one connecting portion and/or the second base plate, and the influence of heat on proper operation of the detection device is thus prevented.

15 Claims, 9 Drawing Sheets

DETECTION DEVICE PREVENTING DAMAGE TO DETECTION MODULE FROM HEAT GENERATED BY LIGHT SOURCE

FIELD

The subject matter herein generally relates to electronic and optical devices, and more particularly, to a detection device.

BACKGROUND

Machine vision inspection in mass production can replace human eyes in difficult or fast-working environments to detect defects in a manufactured object.

In use, an inspection device acquires images of an object, and uses various types of image processing algorithms to analyze the images. To acquire an image of the object, a light source is needed to illuminate the object. However, the light source may generate heat as well as light. The heat may reach an inspection/detection module of the inspection device, thereby affecting the operation and accuracy of the detection module, even resulting in failure of the detection module.

Therefore, there is a room for improvement in the art.

BRIEF DESCRIPTION OF THE DRAWINGS

Implementations of the present technology will now be described, by way of embodiment, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and members have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Embodiment 1

Figure 1:
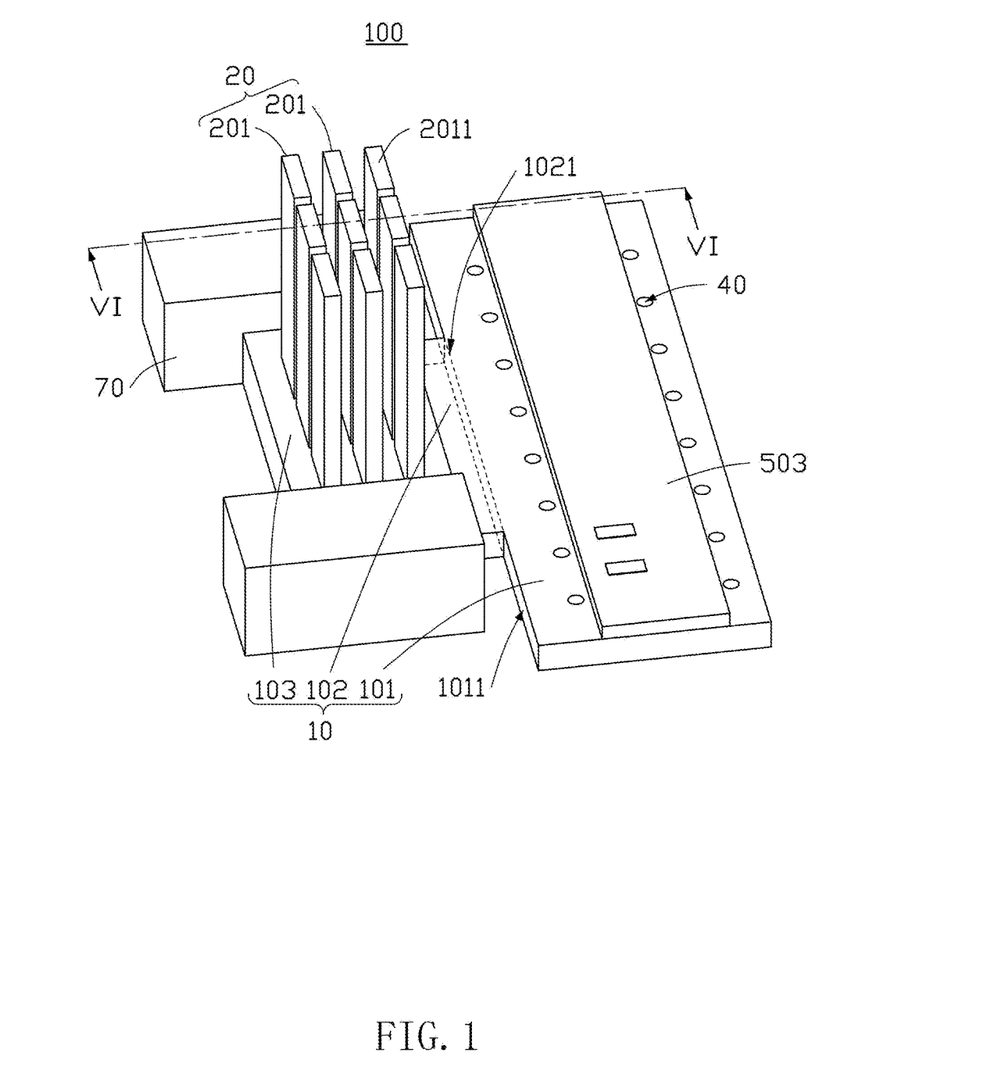
FIG. 1 is a diagrammatic view of a detection device according to an embodiment of the present disclosure.
Figure 2:
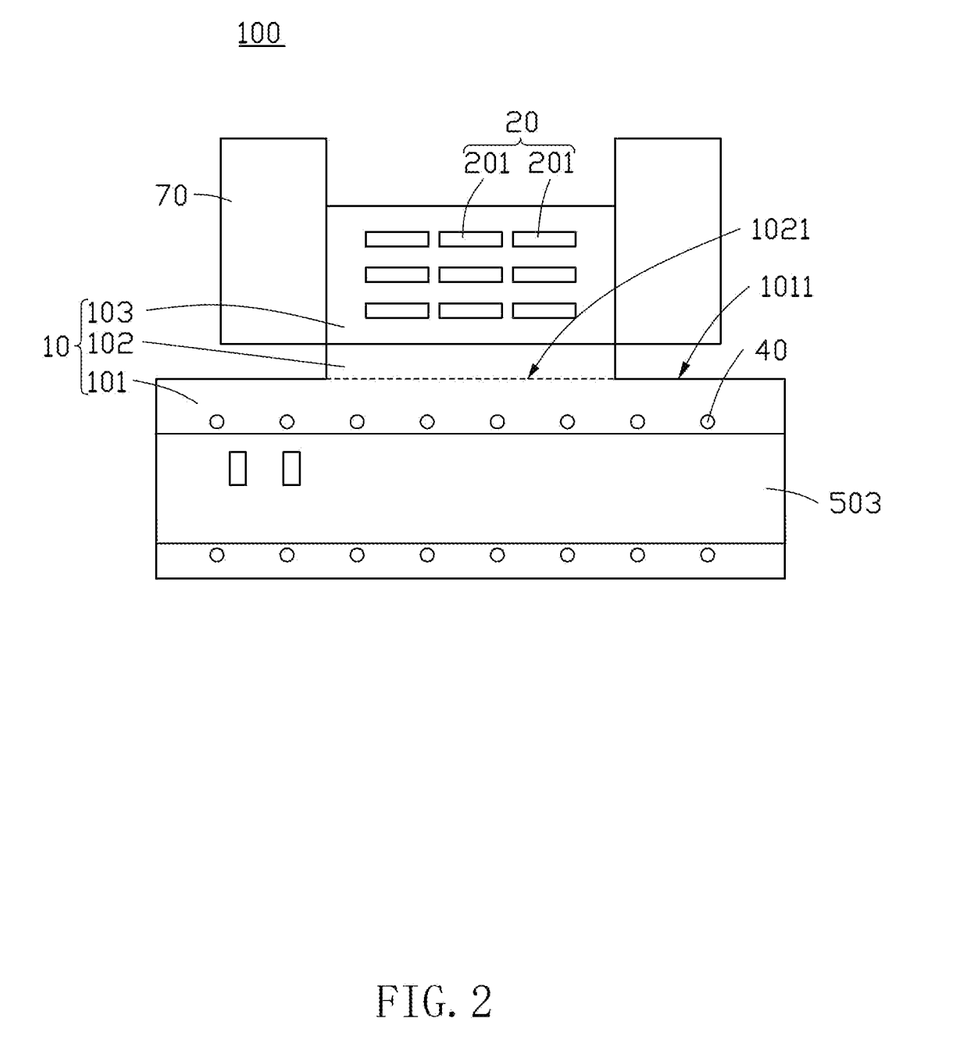
FIG. 2 is a top view of the detection device of FIG. 1.
Figure 3:
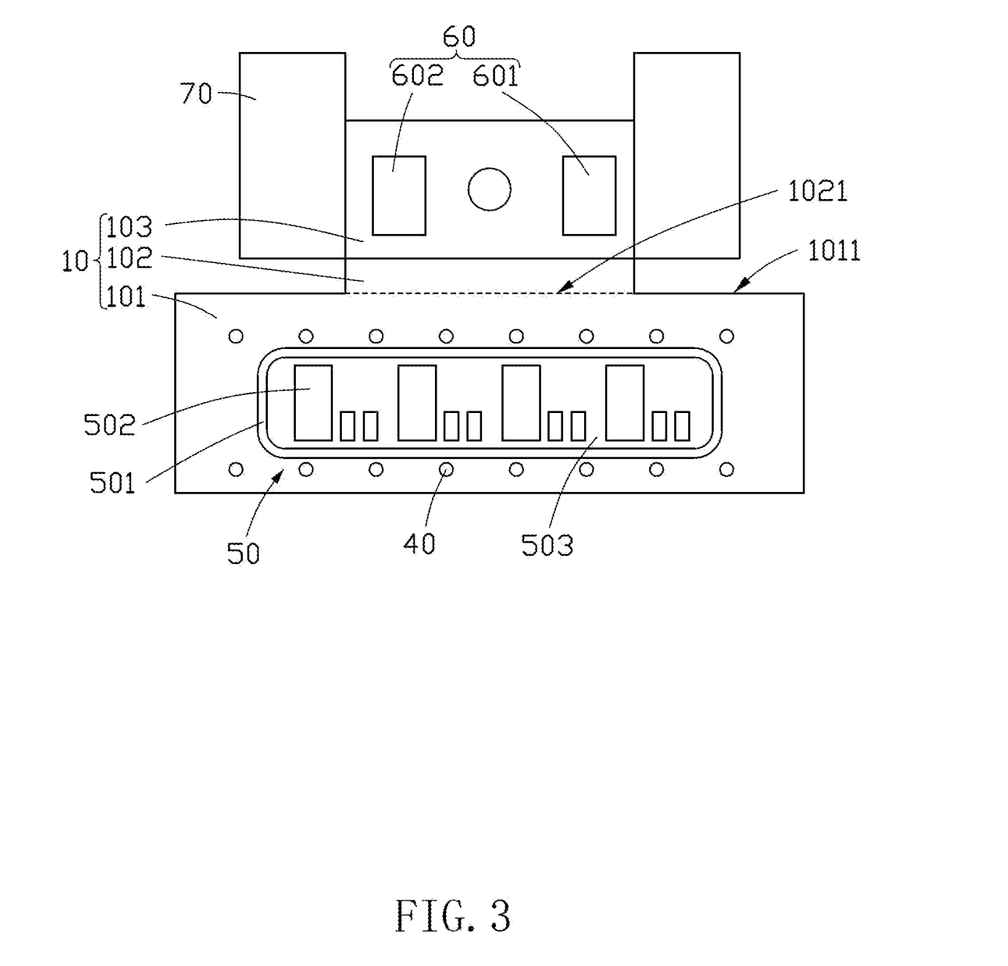
FIG. 3 is a bottom view of the detection device of FIG. 1.

Referring to FIGS. 1 to 3, a detection device 100 is provided according to an embodiment of the present disclosure. The detection device 100 includes a substrate 10, a light source 50, and a detection module 60. The substrate 10 includes a first base plate 101, a second base plate 103, and a connecting portion 102. The connecting portion 102 connects the first base plate 101 to the second base plate 103. The first base plate 101 and the second base plate 103 may be arranged side by side and parallel to each other. The light source 50 is disposed on the first base plate 101, and the detection module 60 is disposed on the second base plate 103. An object to be illuminated and detected (not shown) is disposed below the light source 50 in use. The light source 50 is used to illuminate the object. The detection module 60 is used to capture images of the object when illuminated by the light source 50. The images contain characteristic information (such as surface defects) of the object.

Figure 5:
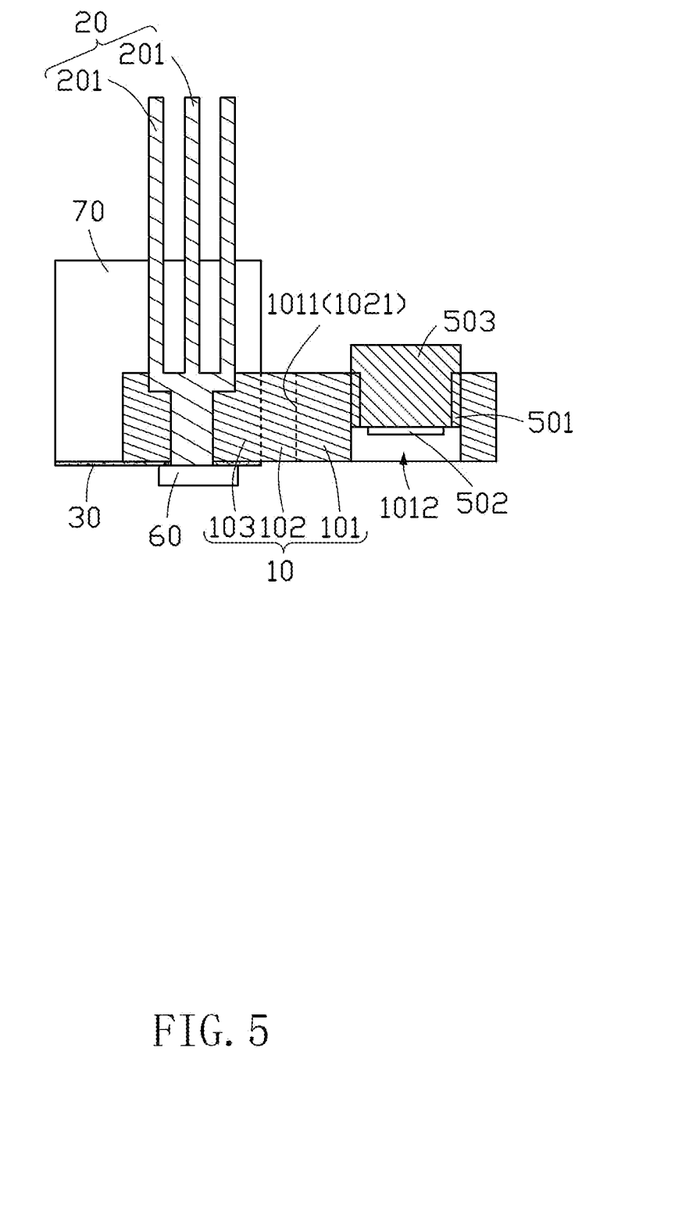
FIG. 5 is a cross-sectional view of the detection device along line VI-VI of FIG. 1.

Referring to FIGS. 3 and 5, a slot 1012 is defined in and passes through a center area of the first base plate 101. The substrate 10 further includes a supporting plate 503 disposed in the slot 1012. The light source 50 is disposed on the supporting plate 503. In at least one embodiment, the light source 50 includes an annular first illuminating unit 501 and a plurality of second illuminating units 502 surrounded by the first illuminating unit 501, so as to provide light with sufficient intensity to illuminate the object. The first illuminating unit 501 may include an LED lamp, and each of the second illuminating units 502 may also include an LED lamp.

Figure 4:
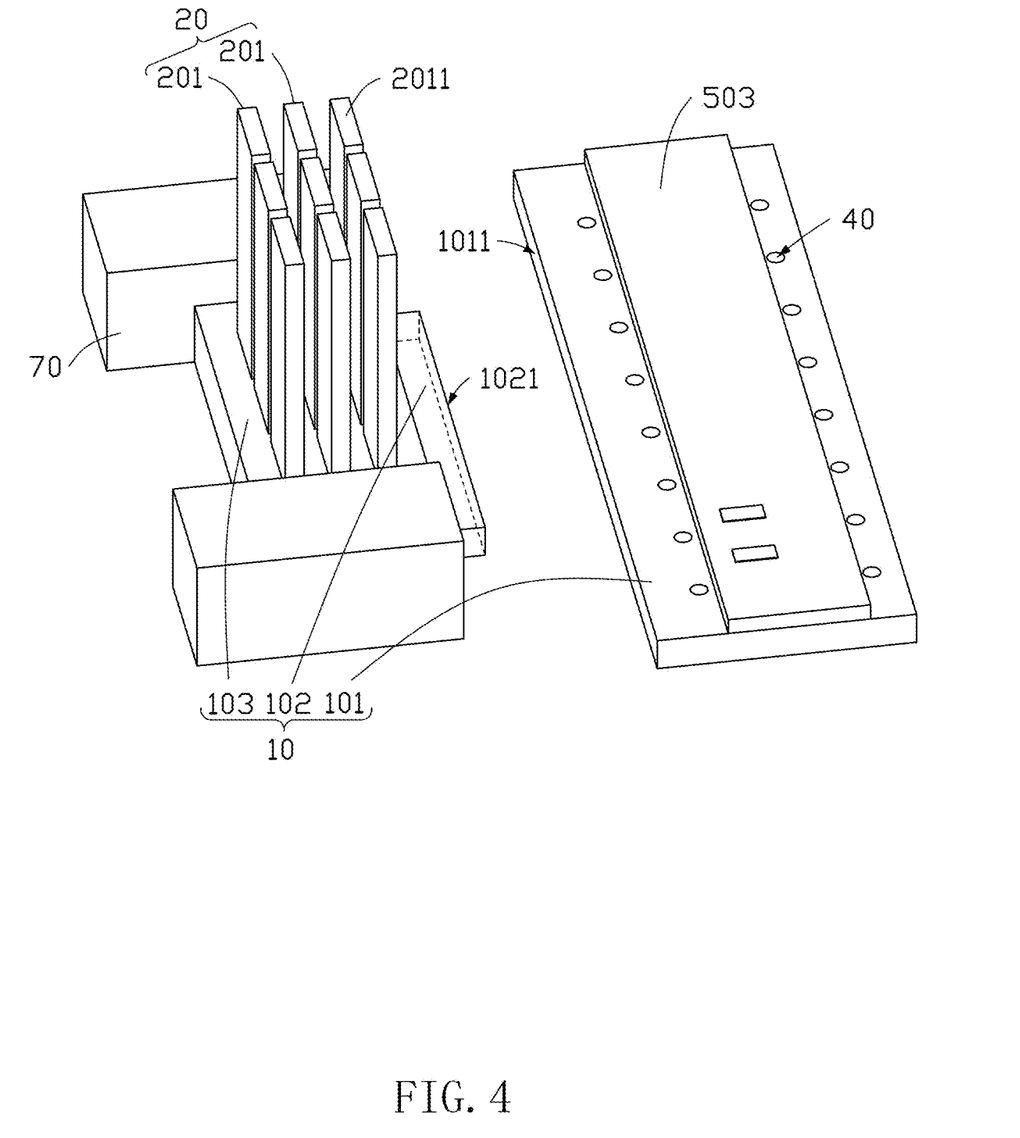
FIG. 4 is a partially exploded view of the detection device of FIG. 1.

Referring to FIGS. 1 and 4, the first base plate 101 includes a first surface 1011 facing the connecting portion 102, and the connecting portion 102 includes a second surface 1021 facing the first base plate 101. The second surface 1021 connects to a portion of the first surface 1011. That is, a surface area of the second surface 1021 is less than that of the first surface 1011. As such, the connecting portion 102 blocks a portion of the heat generated by the light source 50 on the first base plate 101 from being transferred to the connecting portion 102. That is, the heat transferred to the second base plate 103 through the connecting portion 102 is reduced, so as to reduce the heat accumulated on the second base plate 103 to protect the detection module 60.

Referring to FIGS. 1 and 2, the detection device 100 further includes two mounting blocks 70. The two mounting blocks 70 are mounted at opposite sidewalls of the second base plate 103. Thus, the detection device 100 can be clamped to an equipment through the mounting blocks 70. In at least one embodiment, the first base plate 101, the connecting portion 102, and the second base plate 103 may be integrally formed of a same material. The first base plate 101, the connecting portion 102, and the second base plate 103 may also be assembled together and made of different materials with different thermal conductivities. Optionally, the first base plate 101, the connecting portion 102, and the second base plate 103 are made of different materials with different thermal conductivities. The thermal conductivity of the material of the connecting portion 102 is less than the thermal conductivity of the material of the first base plate 101, and also less than the thermal conductivity of the material of the second base plate 103. As such, the heat transferred from the first base plate 101 to the connecting portion 102 is further reduced. The connecting portion 102 may be a flexible printed circuit board (FPC), a rigid circuit board, or a flexible-rigid circuit board. The connecting portion 102 may be made of plastic (such as PP and PS), glass fiber, fiber reinforced concrete (FRC), metal such as iron or aluminum, or alloy. For example, the connecting portion 102 may be made of an FR4 material.

When the surface area of the second surface 1021 is less than 80% of the surface area of the first surface 1011, a large portion of the heat generated on the first base plate 101 is prevented from passing through the second surface 1021 of the connecting portion 102. Instead, such portion of the heat is dissipated to the ambient environment, thus improving the heat dissipation efficiency of the detection device 100. When the surface area of the second surface 1021 is less than 20% of the surface area of the first surface 1011, a large portion of heat on the first base plate 101 is blocked at the interconnection region between the connecting portion 102 and the first base plate 101. The heat dissipation efficiency of the detection device 100 is thus higher.

Referring to FIGS. 1, 2, and 3, the detection module 60 and the light source 50 are disposed on a same surface of the substrate 10. The detection module 60 includes a camera 601 and a driving circuit 602 electrically connected to the camera 601. The driving circuit 602 controls the camera 601 to capture images of the object. In at least one embodiment, the detection device 100 further includes a heat dissipation module 20. The heat dissipation module 20 includes a heat dissipation device 201 composed of a plurality of heat dissipation fins 2011. The heat dissipation device 201 is disposed on a surface of the second base plate 103 away from the detection module 60. In another embodiment, the heat dissipation device 201 may also be disposed on the connecting portion 102, dissipating the heat delivered to the connecting portion 102. In other embodiments, the heat dissipation device 201 may also include a vapor chamber.

Referring to FIGS. 3 and 5, in order to optimize a working environment of the detection module 60, a thermal insulation layer 30 is disposed between the second base plate 103 and the detection module 60. The thermal insulation layer 30 is used to prevent the heat on the second base plate 103 from being transferred to the detection module 60. The thermal insulation layer 30 can be made of silica gel, hydrogel, or a thermal insulation coating.

Referring to FIGS. 1 and 3, in at least one embodiment, a heat dissipation hole 40 is defined on at least one of the first base plate 101 and the second base plate 103. The heat dissipation hole 40 may be near the light source 50 or the detection module 60, so as to dissipate the heat from the light source 50 and the detection module 60.

With the above configuration, the connecting portion 102 is arranged between the first base plate 101 and the second base plate 103, and the second surface 1021 of the connecting portion 102 is connected to only a portion of the first surface 1011 of the first base plate 101. Thus, a portion of the heat generated on the first base plate 101 is prevented from being transferred to the second base plate 103. That is, the heat transmitted to the second base plate 103 is reduced, thereby reducing risk of heat-derived malfunction of the detection module 60. Furthermore, the heat dissipation module 20 is disposed on at least one of the connecting portion 102 and the second base plate 103. The heat dissipation module 20 dissipates the heat on the connecting portion 102 or the second base plate 103, thereby providing a better working environment for the detection module 60.

Embodiment 2

Figure 6:
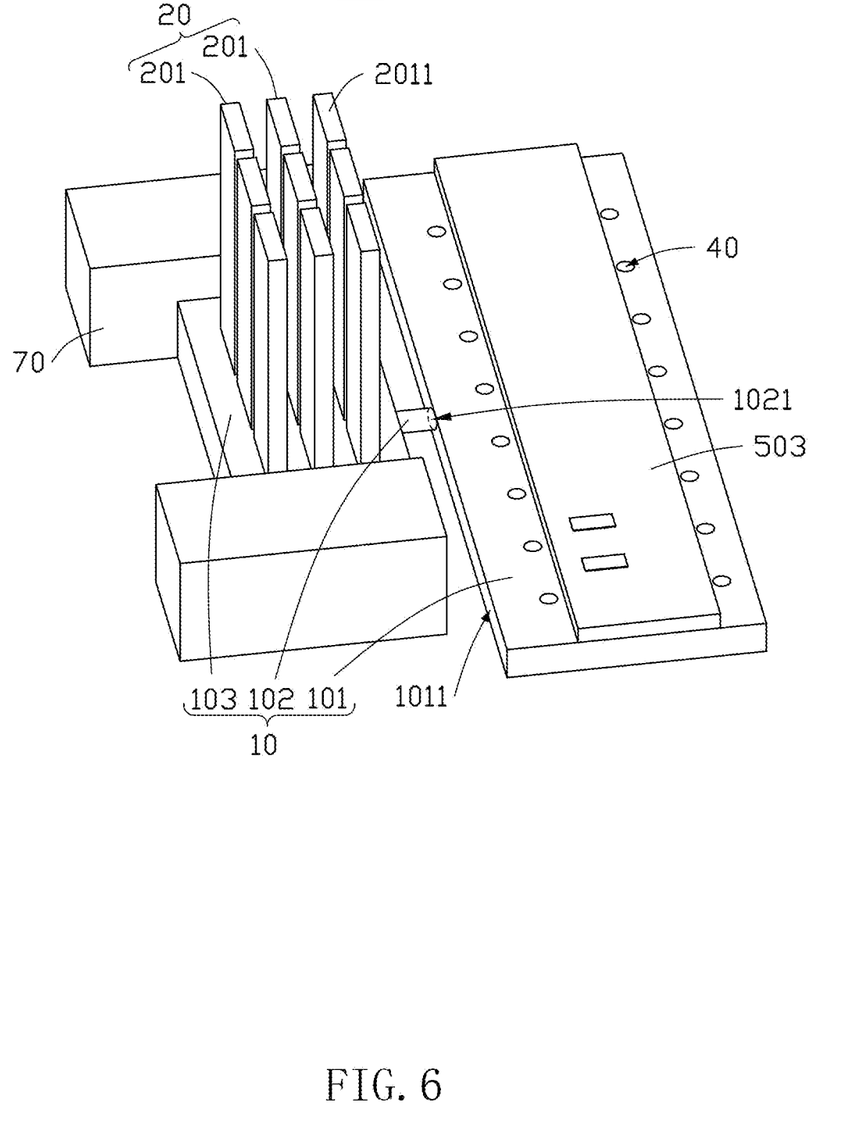
FIG. 6 is a diagrammatic view of the detection device according to another embodiment of the present disclosure.

Referring to FIG. 6, a difference from Embodiment 1 is that the connecting portion 102 is a cable. In at least one embodiment, the connecting portion 102 is a coaxial cable.

Embodiment 3

Figure 7:
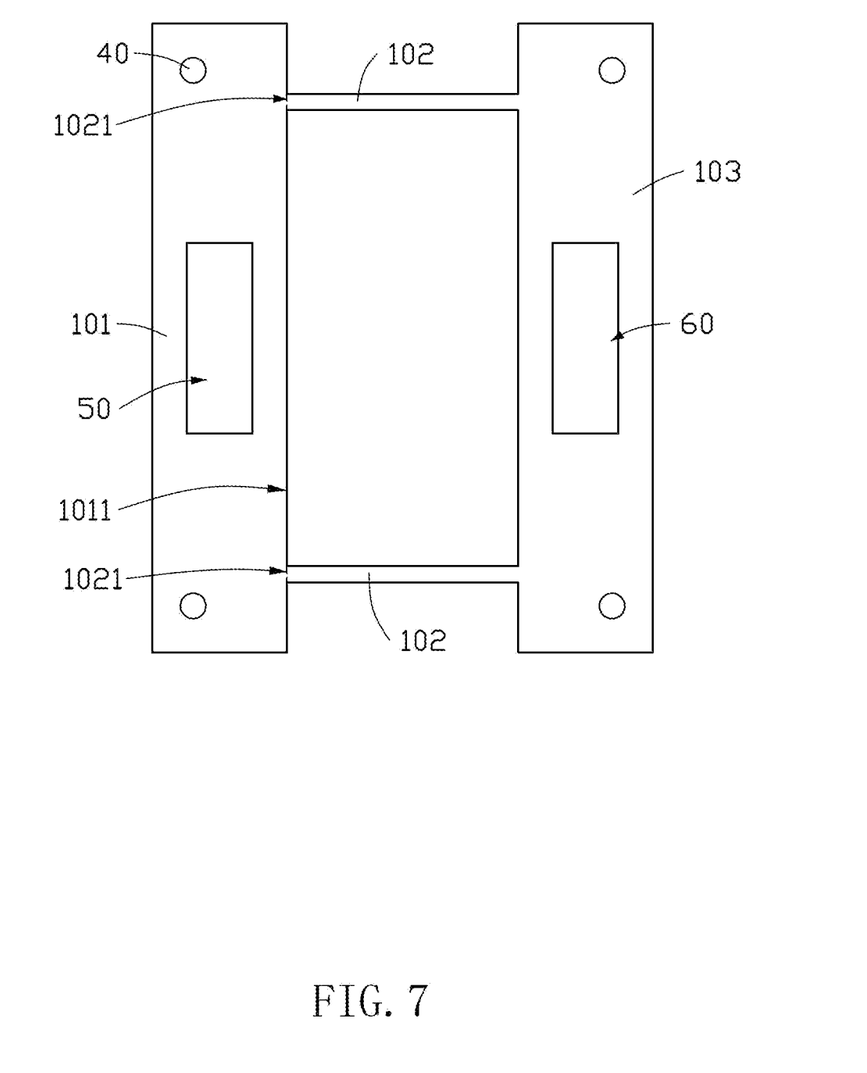
FIG. 7 is a top view of a substrate of the detection device according to another embodiment of the present disclosure.

Referring to FIG. 7, a difference from Embodiment 1 is that more than one connecting portion 102 may be set between the first base plate 101 and the second base plate 103 in order to improve strength between the first base plate 101 and the second base plate 103. Each connecting portion 102 is perpendicular to the first surface 1011 and the second surface 1021. A total surface area of the second surfaces 1021 of all the connecting portions 102 is less than the surface area of the first surface 1011. In at least one embodiment, two connecting portions 102 are included, arranged side by side and spaced apart from each other.

Embodiment 4

Figure 8:
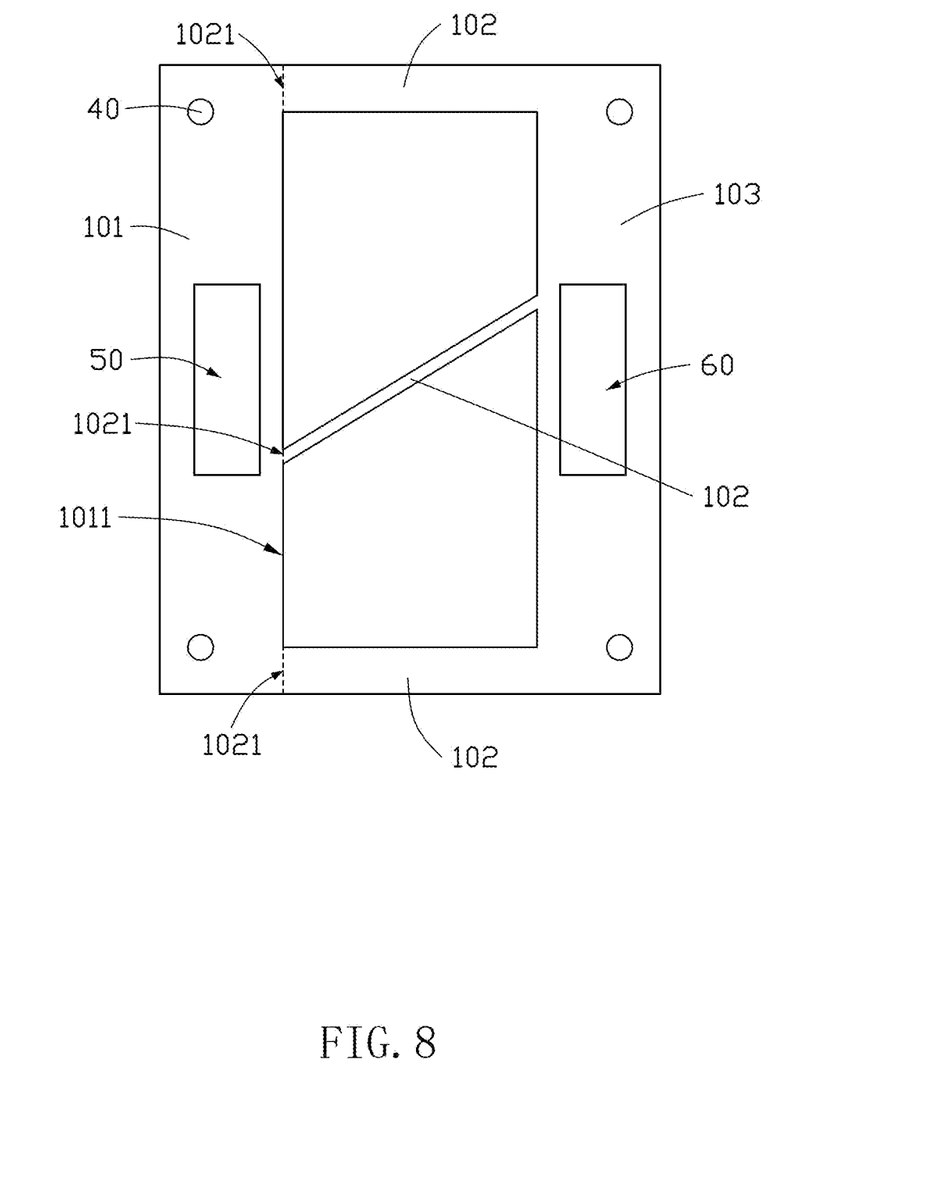
FIG. 8 is a top view of a substrate of the detection device according to yet another embodiment of the present disclosure.

Referring to FIG. 8, a difference from Embodiment 1 is that more than one connecting portion 102 may be set between the first base plate 101 and the second base plate 103 in order to improve strength between the first base plate 101 and the second base plate 103. In at least one embodiment, three connecting portions 102 are included, and a total surface area of the second surfaces 1021 of all the connecting portions 102 is less than the surface area of the first surface 1011. One of the connecting portions 102 is inclined with respect to the first surface 1011. Thus, the inclined connecting portion 102 lengthens a path for the delivery of heat from the first base plate 101 to the second base plate 103. Thus, a portion of the heat on the first base plate 101, instead of being delivered to the second base plate 103, is dissipated to the ambient environment. The other two of the connecting portions 102 are vertically connected between the first base plate 101 and the second base plate 103, and are spaced apart from each other. The inclined connecting portion 102 is disposed between the two connecting portions 102.

Embodiment 5

Figure 9:
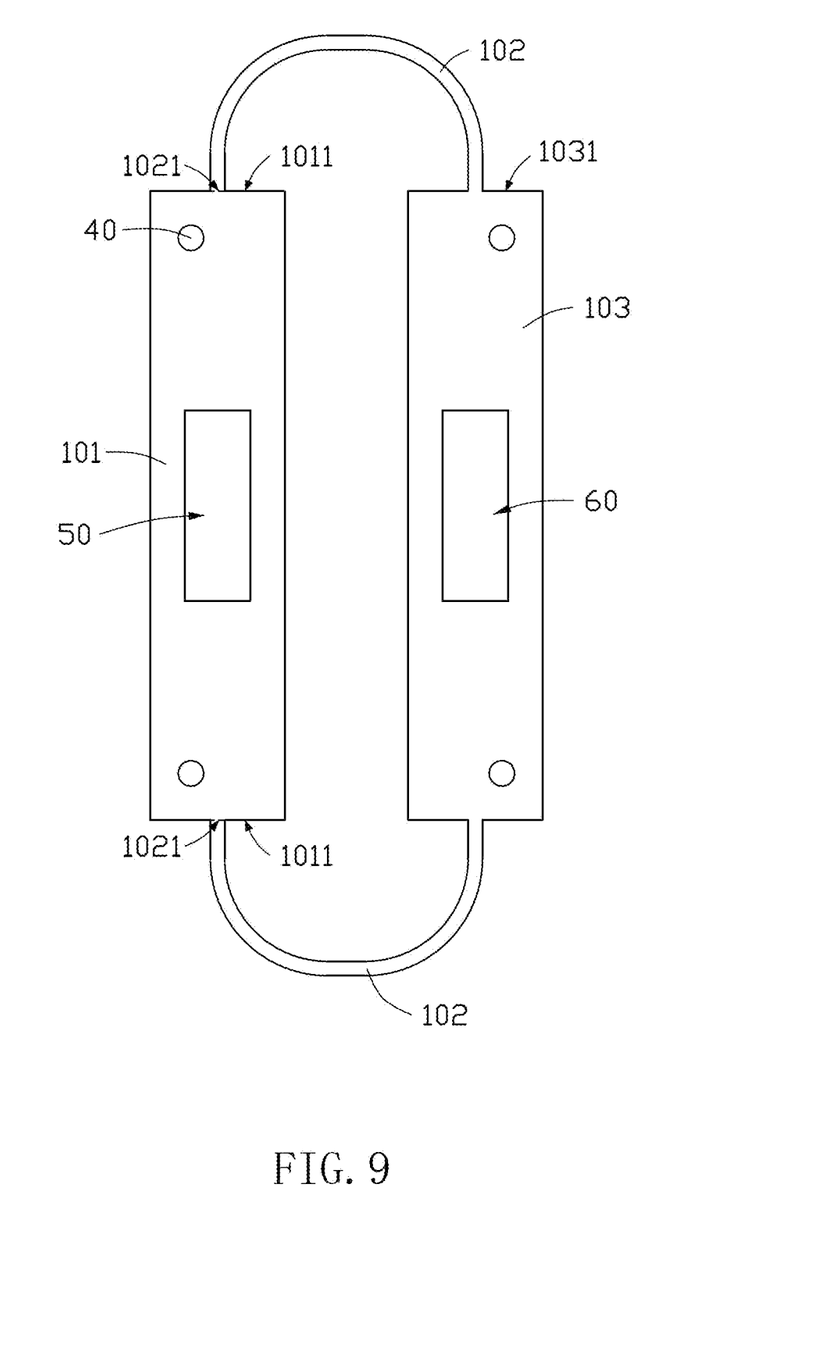
FIG. 9 is a top view of a substrate of the detection device according to yet another embodiment of the present disclosure.

Referring to FIG. 9, a difference from Embodiment 3 is that each of the connecting portions 102 is disposed on a same side of the substrate 10. In detail, each of the connecting portions 102 connects the first surface 1011 of the first base plate 101 to a third surface 1031 of the second base plate 103. The first surface 1011 of the first base plate 101 and the third surface 1031 of the second base plate 103 are disposed on a same side of the substrate 10. Each of the connecting portions 102 is arcuate in shape, being convex away from the first base plate 101 and the second base plate 103. Thus, a path for the delivery of heat from the first base plate 101 to the second base plate 103 is also lengthened, which improves the heat dissipation and reduces the heat delivered to the second base plate 103. In at least one embodiment, two connecting portions 102 are included, and each of the connecting portions 102 is arcuate in shape. Two ends of each of the connecting portions 102 are connected to the first base plate 101 and the second base plate 103. The total surface area of the second surfaces 1021 of all the connecting portions 102 is less than the surface area of the first surface 1011. In other embodiments, each of the connecting portions 102 may also be connected between the first base plate 101 and the second base plate 103. Each of the connecting portions 102 may have a wave shape, which also lengthens the path for the delivery of heat from the first base plate 101 to the second base plate 103.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A detection device, comprising:
 a substrate comprising a first base plate, a second base plate, and at least one connecting portion connecting the first base plate to the second base plate, wherein the first base plate comprises a first surface towards the at least one connecting portion, the at least one connecting portion comprises a second surface towards the first base plate, the second surface is connected to a portion of the first surface;
 a light source disposed on the first base plate;
 a detection module disposed on the second base plate, wherein the detection module comprises a camera and a driving circuit electrically connected to the camera; and
 a heat dissipation module disposed on the at least one connecting portion and/or the second base plate.

2. The detection device of claim 1, wherein the at least one connecting portion is disposed between the first base plate and the second base plate, and the at least one connecting portion is perpendicular to the first surface.

3. The detection device of claim 1, wherein the at least one connecting portion is disposed between the first base plate and the second base plate, and the at least one connecting portion is inclined with respect to the first surface.

4. The detection device of claim 1, wherein the at least one connecting portion connects the first surface of the first base plate to a third surface of the second base plate, the first surface of the first base plate and the third surface of the second base plate are disposed on a same side of the substrate; the at least one connecting portion is convex away from the first base plate and the second base plate.

5. The detection device of claim 1, wherein the at least one connecting portion comprises a plurality of connecting portions, and a total surface area of the second surfaces of the plurality of connecting portions is less than a surface area of the first surface.

6. The detection device of claim 1, wherein the at least one connecting portion is a flexible printed circuit board, a rigid circuit board, a flexible-rigid circuit board, or a cable.

7. The detection device of claim 1, wherein a surface area of the second surface is less than 80% of a surface area of the first surface.

8. The detection device of claim 7, wherein the surface area of the second surface is less than 20% of the surface area of the first surface.

9. The detection device of claim 1, further comprising a thermal insulation layer sandwiched between the second base plate and the detection module.

10. The detection device of claim 1, wherein a plurality of heat dissipation holes are defined on the substrate.

11. The detection device of claim 1, wherein the heat dissipation module comprises a plurality of heat dissipation fins.

12. The detection device of claim 1, wherein the first base plate, the at least one connecting portion, and the second base plate are integrally formed.

13. The detection device of claim 1, wherein a slot is defined on the first base plate, the detection device further comprises a supporting plate disposed in the slot; the light source is disposed on the supporting plate.

14. The detection device of claim 1, wherein the light source comprises an annular first illuminating unit and a plurality of second illuminating units surrounded by the first illuminating unit.

15. The detection device of claim 1, further comprising two mounting blocks, wherein the two mounting blocks are mounted at opposite sidewalls of the second base plate, and the two mounting blocks are configured to mount the detection device to an equipment.

* * * * *